United States Patent [19]

Tsai

[11] Patent Number: 5,634,652
[45] Date of Patent: Jun. 3, 1997

[54] BICYCLE SUSPENSION

[76] Inventor: Chin-Sung Tsai, No. 10, Alley 23, Lane 294 Sec. 4, Cheng Kung Road, Taipei, Taiwan, 114

[21] Appl. No.: 413,531

[22] Filed: Mar. 30, 1995

[51] Int. Cl.⁶ .................................................. B62K 25/08
[52] U.S. Cl. .......................... 280/276; 188/297; 188/311; 267/195; 267/292
[58] Field of Search ................................ 280/275, 276, 280/283; 188/266, 297, 301, 311, 313, 314, 316, 319; 267/195, 196, 201, 205, 217, 219, 292

[56] References Cited

U.S. PATENT DOCUMENTS

| 2,708,112 | 5/1955 | Seddon et al. |
| 4,037,855 | 7/1977 | Smith. |
| 4,153,266 | 5/1979 | Uhls. |
| 4,421,337 | 12/1983 | Pratt. |
| 4,561,669 | 12/1985 | Simons. |
| 4,971,344 | 11/1990 | Turner. |
| 5,088,705 | 2/1992 | Tsai. |
| 5,104,101 | 4/1992 | Anderson et al. ............... 267/219 |
| 5,193,832 | 3/1993 | Wilson et al.. |
| 5,193,833 | 3/1993 | Reisinger. |
| 5,269,549 | 12/1993 | Wilson et al.. |
| 5,310,203 | 5/1994 | Chen ............................ 280/276 |
| 5,449,189 | 9/1995 | Chen ............................ 280/276 |

*Primary Examiner*—Brian L. Johnson
*Assistant Examiner*—Victor E. Johnson
*Attorney, Agent, or Firm*—John R. Duncan; Frank D. Gilliam

[57] ABSTRACT

A suspension member for a bicycle is set forth which includes a strut telescopically received into a cylinder. A head assembly extends from the cylinder through a piston defined at the end of the strut and into the strut. Mounted to the assembly is a valve member which forms between it and the piston a volume which increases and decreases as the suspension telescopes. In response to a bump, the suspension collapses against a bias. The bias urges the member to rebound. When rebounding the valve member acts to define a restriction to exhaust air from the volume to dampen removed. Also set forth are elastomer pads and couplers which can be removed from the suspension member as a unit for replacement.

14 Claims, 4 Drawing Sheets

BICYCLE SUSPENSION

BACKGROUND

This invention relates to spring suspensions for bicycles.

Spring suspensions are known and have been used for bicycles. Such suspensions are particularly popular in mountain or offroad bicycles where bumps are encountered.

Such suspensions for the front wheel of a bicycle may include a pair of parallel arranged, telescoping strut and tube members. In response to displacement of the front wheel when a bump is encountered, the members telescopically collapse or retract against the bias of elements such as springs or elastomer pads. The bias elements compress to absorb the forces displacing the front wheel relative to the bicycle frame and thereafter urge the members to telescopically extend to return the front wheel to its unloaded or normal position.

Where the bias elements are elastomer pads, the pads may be removed and replaced to adjust the compressibility and response of the supervision. Where the pads are accessible from the top, it may be necessary to turn the bicycle over to dump out the pads. This is inconvenient and time consuming. Further, the presence of a lubricant or other factors may prevent release of a pad or pads when the bicycle is overturned.

Drawbacks of the aforementioned types of spring suspensions are that, while the bias elements absorb the loads by compression, very little damping is provided during compression or extension. As the loads are released on the front wheel which had caused its displacement, the bias of the elements acts to abruptly snap or rebound the front wheel back to its unloaded position. This rebound generates vibrations in the bicycle to the discomfort of the rider, to the detriment of control over the bicycle and contributing fatigue to the mechanical components of the bicycle.

There is accordingly a need for a bicycle suspension which not only acts to absorb the forces related to upward displacement of the wheel when encountering a bump, but also acts to dampen at least the rebound.

Further there is a need to provide a construction where the elastomer pads can be removed from the top of the suspension while the bicycle is upright and which provides for the interchange of pads for replacement or to adjust the bias of the bicycle.

SUMMARY

There is, accordingly set forth an improved suspension which overcomes the problems noted above associated with the abrupt rebound of telescoping wheel suspension systems and with removal and replacement of pads.

According to this end, there is set forth an improved suspension which is adapted to be coupled between a frame and an axle. The suspension includes a pair of members, each having a cylinder closed at one end and open at the other end to define an open chamber. A tubular strut is received into the chamber for telescopic contraction of the strut into the chamber in response to forces displacing the wheel toward the frame and to telescopically extend to return the wheel to its normal position. At the end of the strut is defined a piston. In a typical fashion the cylinder and strut are coupled between the bicycle frame and wheel.

To urge the wheel to the normal, extended position, biasing means such as a spring or elastomer pads are included and are disposed in the strut. When the strut and cylinder telescopically contract they do so against the bias offered by the biasing means. When the loads which have displaced the front wheel relative to the frame of the bicycle causing the telescopic contraction have been removed, these biasing means urge the cylinder and strut arrangement to telescopically extend to reposition the front wheel at its normal, member extended position.

To support the biasing means and to dampen the extension of the front wheel to its normal, extended position, the present invention includes a stem assembly fixed at one end to the cylinder and passing through an axial bore in the piston to position, within the strut, a head having first or second flanges or stops defining a body therebetween. A valve member is movably disposed on the body between the flanges and slidably seals the head within the strut. Between the valve member and piston within the strut there is defined a volume which increases as the strut and cylinder contact or collapse against the bias of the biasing means, i.e. as the piston moves into the cylinder. This volume, conversely decreases as the members telescopically extend.

During telescopic contraction of the cylinder and strut, the strut urges the valve member to a position abutting the second flange, the strut thereafter collapsing relative to the valve member as the valve member slidably seals within the strut. During extension or rebound, the movement of the strut relative to head urges the valve member to abut the first flange and thereafter slidably and sealably move relative thereto.

During the aforesaid contraction of the cylinder and strut, means are provided at the head to cooperate with the valve member for defining a vent through which air is drawn into the volume defined between the piston and valve member. During telescopic extension, also referred to as rebound, these means define a restriction to restrict the exhaust of air from the volume as it decreases to thereby dampen the rebound action of the members. These venting means may include a port or groove fashioned in the stem head which is open for relatively free communication when the valve member is in a position to abut the second flange and is restricted when the valve member is in a position to abut the first flange. Alternatively, the venting means may include orifices or ports fashioned in either of the head or valve member to accomplish the same ends.

As can be appreciated, the valve member not only provides a seal necessary to define the volume but also is moveable to control the flow of air into and out of the volume by defining, where dampening is required, a restriction. Accordingly, the improved suspension of the present invention provides a simple arrangement to dampen the forces resulting from, at least, rebound of the suspension member. This in turn results in a simple and inexpensive construction. Further, the dampening of at least the rebound of the suspension member contributes to the control of the bicycle, comfort of the rider and reduces forces which may contribute fatigue to the mechanical components of the bicycle.

As a further aspect, the elastomer pads are defined as cylindrical elastic elements each having, proximate each end, a circumferential notch. Cylindrical couplers, each having a circumferential finger at each end, are adapted to couple adjoining pads in an end-to-end relationship. The coupling, facilitated by the couplers, permits the stack of pads to be removed as a unit from the top of the member for replacement of one or more pads.

BRIEF DESCRIPTION OF THE DRAWINGS

There is, therefore, according to the present invention set forth an approved suspension system as shown in the specification, claims and drawings wherein:

DESCRIPTION

Figure 1:
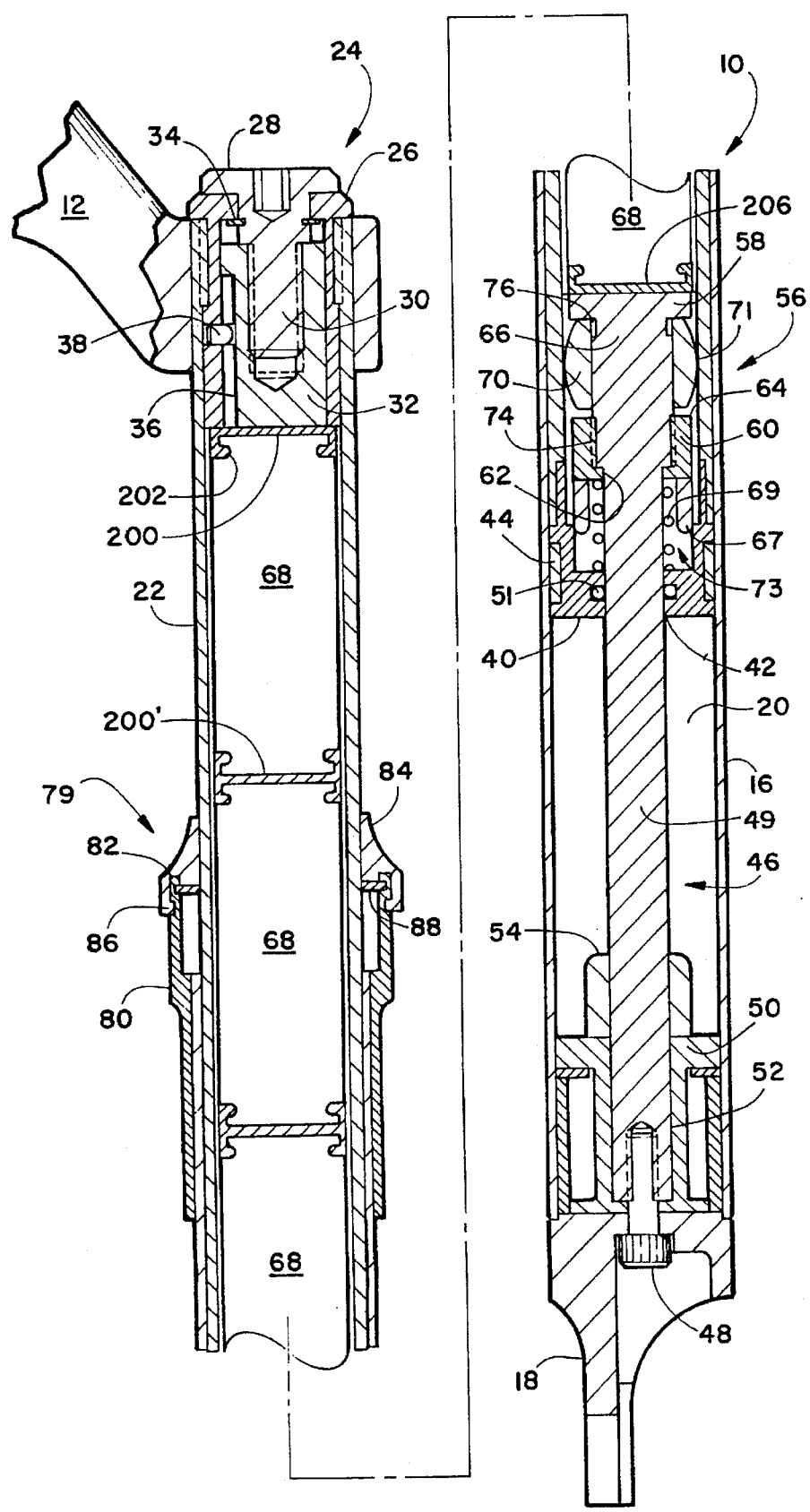
FIG. 1 is a section view of the improved suspension system member according to the present invention.
Figure 2:
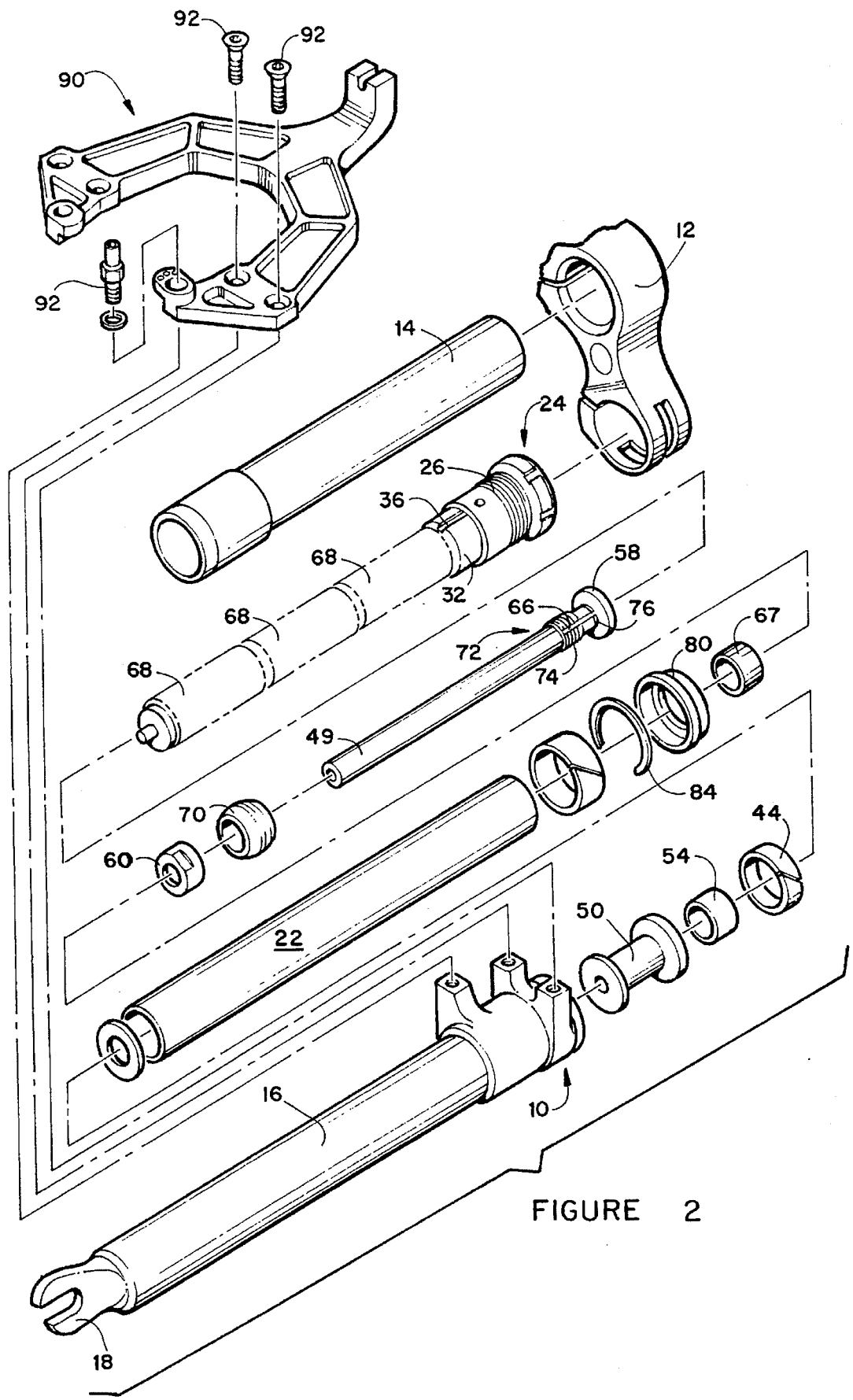
FIG. 2 is an assembly view of the improved suspension system member according to the present invention.

Turning to FIGS. 1 and 2, a suspension including the elements of the present invention is shown. The suspension is adapted to provide attachment of the front wheel to the bicycle frame and toward that end includes a pair of suspension members 10 defining what is generally known as the front fork for the bicycle. In that the members 10 are mirror images of one another, only one member is shown in the drawings and will be described herein.

The members 10 are secured at one end to the frame at a bracket 12 which is pivotally mounted to the bicycle frame as by a post 14. The bicycle handlebars are connected to the bracket 12 so that in turning the handlebars the bracket 12 pivots about the post 14, in a known manner, turning the bicycle fork and the front wheel (not shown). As hereinafter described, the members 10 also provide for the displacement of the front wheel relative to the bicycle frame in response to encountering a bump or the like.

With specific attention drawn to the member 10 shown in the drawings, the member 10 includes a cylinder 16 closed at one end and fashioned to define a foot 18 for coupling the member 10 to the axle for the front wheel. Opposite the foot 18 the cylinder is open thereby defining an open ended chamber 20.

To cooperate with the cylinder 16 the member 10 includes a hollow, tubular strut 22 telescopically received by the cylinder 16 into the chamber 20.

The cylinder 16 and strut 22 have cooperating cross-sectional configurations, such as circular, so that the strut 22 can be closely received into the chamber 20 and guided by the cylinder 16 for telescopic contraction and expansion of the strut 22 into and from the chamber 20. In this manner the member 10 can accommodate displacement of the front wheel relative to the bicycle frame in response to encountering a bump through telescopic response of the member 10.

To provide a closure at one end, the strut 22 has a cap assembly 24. The cap assembly 24 includes a cap nut 26 threadably coupled into the strut top end. The cap nut 26 rotatably and concentrically mounts a bias adjust knob 28 having a shank 30 threadably received into a bias adjust follower 32. A snap ring 34 secures the bias adjust knob 28 to the cap nut 26. The follower 32 has a longitudinally extending slot 36 to receive a pin 38 which is fixed to the cap nut 26.

Also the follower 32 has at its end fashioned a cylindrical coupler 200. The coupler 200 has a radially inwardly projecting, circumferential finger 202 the purposes of which will hereinafter become evident.

As can be appreciated rotation of the bias adjust knob 28 axially displaces the follower 32 in that the same is held against rotation by the reception of the pin 38 in the slot 36. As will hereinafter be described, the bias adjust knob 28 is adapted to adjust the response of the member 10 to the forces generated when the front wheel encounters a bump or the like.

At the bottom end of the strut 22 is fashioned a piston 40 which is adapted to be closely received within the chamber 20. The piston 40 has an axial bore 42 the purposes of which will hereinafter become evident. A sealing ring 44 disposed about the circumference of the piston 40 provides a seal between the piston 40 and the walls of the chamber 20. With reference to FIG. 1, the telescopic contraction of the member 10 causes the strut 22 and its piston 40 to extend into the chamber 20. Conversely, extension of the member 10 withdraws the strut 22 and its piston 40 from the chamber 20.

To cooperate with the other components described herein to accomplish the desired ends, the member 10 includes a stem assembly 46 secured at one end by a screw 48 to the foot 18. A post 49 extends axially from the foot 18 through the chamber 20 to pass through the bore 42 in the piston 40 into the strut 22. A ring 51 is disposed at the piston bore 42 to slidably guide and seal the piston 40 along the post 49. A dowel shaped support 50 is nested at the bottom of the chamber 20 and has an axial bore 52 to pass and support the end of the stem assembly 46. The support 50 also mounts a cylindrical, resilient bottoming bumper 54 which rests on the support 50 about the stem assembly post 49. The bottoming bumper 54 provides a cushion in the event that the strut 22 is telescopically retracted into the chamber 20 to such an extent that the piston 40 encounters the resilient bumper 54.

With continued reference to FIG. 1, the stem assembly post 49 passes through the axial bore 42 of the piston 40 into the strut 22. At its top end the stem assembly 46 has a head assembly 56. The head assembly 56 includes a first flange 58 defining the top of the stem assembly 46. The first flange 58, as described below, also provides the bottom support for the biasing means which urge the strut 22 and cylinder 16 to its extended position and provide a bias response resisting telescopic retraction. The head assembly 56 is threaded along a portion of its longitudinal length and is adapted to receive a nut 60 which includes an axial opening 62 to pass the post 49. The upper-most annular surface of the nut 60 defines a second flange 64 for the head assembly 56. The space between the first and second flanges 58, 64 defines a body 66 for the head assembly.

Disposed between the head assembly 56 and more particularly the first flange 58 and the follower 32 are biasing means shown for purposes of illustration herein as a series of elastomer pads 68. Springs or other biasing means could be used in the place of the pads 68. These pads 68, which may be micro-cellular urethane, are hooked together in the hollow strut 22 and are adapted to urge the member 10 to its extended position whereat the front wheel of the bicycle is at its normal, extended position relative to the bicycle frame. Upon encountering a bump or the like, the relative forces between the bicycle frame and front wheel urge the strut 22 and cylinder 16 to telescopically contract which compresses the pads 68 between the first flange 58 and the follower 32. In this fashion the forces causing the relative displacement of the front wheel are absorbed to at least some extent by the compression of the pads 68.

Figure 3:
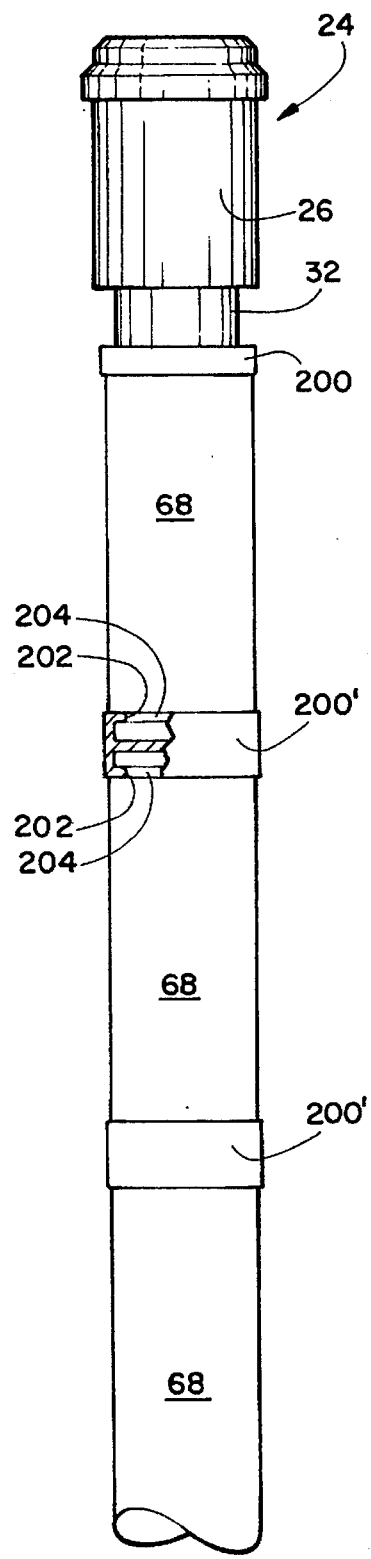
FIG. 3 is a side view of a stack of elastomer pads disposed in the suspension system member and the interconnecting couplers.

To retain the pads 68 in the strut 22 in the end to end relationship a plurality of couplers 200' are provided. As shown in FIG. 3 each of the pads 68 has proximate each end a circumferential notch 204. The circumferential notch 204 of the uppermost pad 68 cooperates with the coupler 200 fashioned on the follower 32 to removably secure the uppermost pad 68 thereto. Finger 202 of the coupler 200 is adapted to resiliently pass the end of the uppermost pad 68 to removably engage into its notch 204. In that the pads 68 are resilient, they deform to be received and coupled into the coupler 200 in response to axially pushing the pad 68 into the coupler 200.

In a like manner a plurality of cylindrical intermediate couplers 200' are disposed between adjacent pads 68 as loaded into the strut 22. The intermediate couplers 200' are generally cylindrical having defined at each end fingers 202 adapted to be received into the cooperating pad notches 204 to releasably interconnect the pads 68 to each other and to the follower 32 in an end to end relationship. By removing the cap nut 26, the follower 32 and the connected pads 68 and couplers 200 and 200' can be pulled from the strut 22 as a unit. Often a lubricant such as grease is disposed in the strut 22 to lubricate the compression and extension of the pads 68. By virtue of the couplers 200 and 200' the pads 68 can be removed against any resistance offered by the lubricant. An end coupler 206 is coupled in a like manner to the pad stack opposite the follower 32 to support the bottom most pad 68 against the head assembly 56 and more particularly the first flange 58.

Once the pads 68 have been removed one or more can be replaced or changed to adjust the bias between the strut 22 and cylinder 16. Additionally, as described above, the bias adjust knob 28 can be operated to further adjust the bias when the pads 68 have been reloaded into the strut. By manipulating the bias adjust knob 28 by rotation, the follower 32 is displaced to compress or pre-load the bias means, i.e., pads 68. In this manner, the bias response to the telescopic collapse of the member 10 can be altered.

To resist over-extension, the member 10 includes a resilient upper bumper 67 disposed between the nut 60 and piston 40. In the event of over-extension of the member 10, piston 40 first acts against a spring 69 and thereafter contacts upper bumper 67 to protect against damaging, forceful contact between the piston 40 and nut 60.

To retard or dampen the rebound action described above, there is disposed at the head assembly 56 a truncated, somewhat spherical, resilient valve member 70. The valve member 70 is closely and slidably received over the body 66 of the head assembly 56 and is adapted at its perimeter to sealingly and frictionally engage the strut 22 to define a seal 71. Between the seal 71 and the piston 40 there is defined a volume 73 which expands during contraction of the strut 22 into the cylinder 16 and expands during extension.

The valve member 70 is adapted to control the exhaust and drawing in of air into the volume 73 in response to the telescopic motion between the strut 22 and cylinder 16. Broadly, during retraction, the valve member 70 is adapted to provide, if desired, a first restriction to the drawing of air into the volume 73 and during extension to offer a second restriction to the exhaust of air from the volume 73 to dampen the action of the member 10.

The valve member 70 cooperates with a port 72 fashioned at the head assembly 56. As shown in FIG. 2, the port 72 may be defined by a longitudinal groove 74 along the body 66 terminating at the first flange 58 at a circumferential recess 76 fashioned in the body 66. The groove 74 undercuts the opening 62 of the nut 60 to provide communication across the nut 60.

As can be appreciated, when member 10 telescopically collapses by virtue of the front wheel encountering a bump or the like, the strut 22 is retracted into the chamber 20. The frictional engagement between the valve member 70 and the strut 22 urges the valve member 70 downward in FIG. 1 to abut the second flange 64 defined by the nut 60. In this position, as the piston 40 proceeds into the chamber 20 air is drawn into the expanding volume 73 from the strut 22, the groove 74 and past the seal 71 defined by the valve member 70 and nut 60 into the volume 73. However, upon rebound, as the strut 22 is withdrawn from the chamber 20 under the urging of the pads 68, the frictional engagement between the valve member 70 and the strut 22 draws the valve member 70 to a position to abut the first flange 58 as shown in FIG. 1 to cooperate therewith to cover the recess 76. Accordingly, and by virtue of the seal 71, air drawn is exhausted from the volume 73 as the piston 40 is withdrawn through the groove 74 into the recess 76 and the restriction defined between the abutment of the valve member 70 and first flange 58. The restriction defined by the interaction of the valve member 70, post 72 and first flange 58 thereby, during rebound restricts the exhaust of air from the volume 73 and acts to dampen the rebound.

Figure 4A:
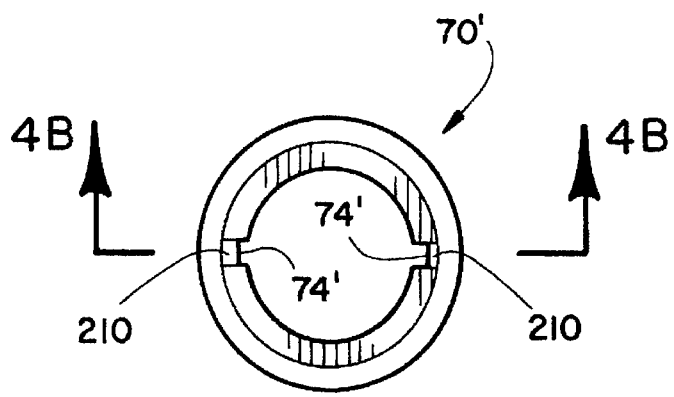
FIGS. 4A–D are end, cross-section and side views of a further embodiment of a valve member for the suspension system.
Figure 4B:
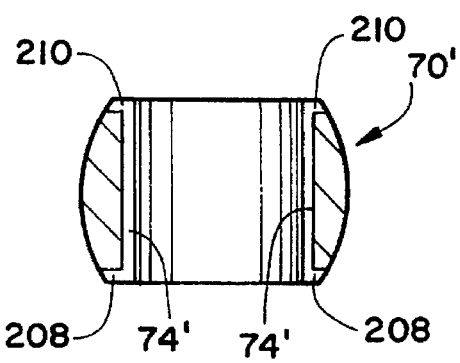
Figure 4D:
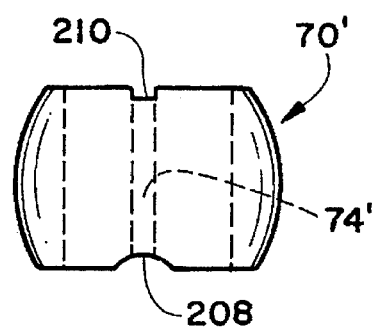
Figure 4C:
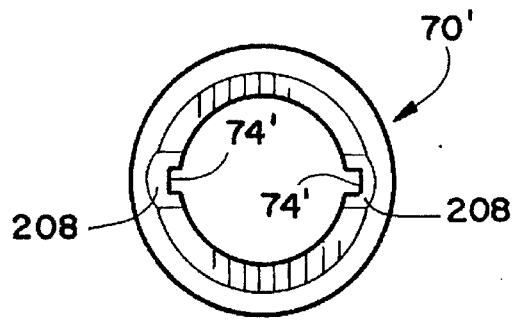

Alternatively, a valve member 70' may be as shown in FIGS. 4A–C. In this embodiment the groove 74 is not provided on the body 66. Instead the valve member 70' has diametrically opposed coaxial grooves 74' each which, at the axial ends of the valve member 70', intersects first and second cavities 208 and 210 fashioned at the axial ends of the valve member 70'. First cavity 208 may be larger in side view profile as shown in FIGS. 4A, C and 4D than the second cavity 210. The valve member 70' is closely and slidably guided by the body 66 to move between abutment with the first flange 58 and second flange 64 as described below.

During telescopic contraction of the member 10 the valve member 70' is urged by frictional engagement with the strut 22 to a position to abut the nut 60 and the second flange 64 defined thereby. As the volume 73 defined between the seal 71 defined by the valve member 70' and the piston 40 increases, air is drawn from the strut 22 through the grooves 74' and the restrictions defined by the first cavities 208 and the second flange 64 as the valve member 70' abuts the second flange 64. The restriction thereby defined acts to dampen the contraction as air must move through the restriction to fill in increasing volume 73.

During rebound, as described above, the movement of the strut 22 draws the valve member 70' to a position to abut the first flange 58. Again the valve member 70' continues to define a seal at 71. As the volume 73 decreases air must pass through the grooves 74', recess 76 and the restriction defined by the valve member 74' its second cavities 210 and the first flange 58. The aforesaid restriction or orifice acts to control by restricting the venting of air from the volume 73. In turn, the rebound of the member 10 is dampened.

As can be appreciated, the size of the first and second cavities 208 and 210 may be altered to change the size of the restrictions and thereby control of the flow of air and the dampening action of the telescopic motion of the member 10. To prevent debris from entering the member 10, a closure assembly 79 is provided. The closure assembly 79 includes a cylindrical male component 80 at the cylinder 16 open end which may be integrated with the cylinder 16. A circumferential, rim 82 is fashioned on the male component 80. Coupled to the male component 80 is a conical female component 84 passed over the strut 22 and having a circumferential lip 86 adapted to snap over and engage and couple with the rim 82. A sealing ring 88 is disposed between the male and female components.

To further support the members 10 and provide a platform for a braking mechanism (not shown), the suspension may also include a C-shaped support 90 secured by fasteners 92 to each of the members 10.

As can be appreciated, the methods and mechanisms described herein for dampening contraction and rebound, is inexpensive and of simple design. The valve members 70, 70' not only seal within the strut 22 but also are positioned by virtue of the relative movement of the strut 22 to the cylinder 16 and stem assembly to control the flow of air into and out of the volume 73 to act to dampen rebound alone or both rebound and contractor.

It is also to be understood that in lieu of the port 72 fashioned in the head assembly 56, a bore could be fashioned co-axially through the valve assembly 70 to accomplish the same ends. That bore would cooperate with the first and second flanges 58, 64 to accomplish the ends described above.

It is to be further understood that while I have shown the member 10 having a lower cylinder 16 and upper strut 22, that the member 10 could be reversed to place the cylinder 16 as the upper component without departing from the spirit and scope of the claims.

While I have shown and described certain embodiments of the present invention it is to be understood that it is subject to many modifications without departing from the spirit and scope of the present invention as set forth in the claims.

I claim:

1. An improved suspension member coupled between a frame and an axle comprising:
    a cylinder;
    a tubular strut having a portion received into the cylinder for telescopic motion, said portion defining at an end received into the cylinder a piston having a bore, said cylinder and strut coupled between the frame and axle, relative motion between the frame and axle accommodated by telescopic motion between the strut and the cylinder;
    means for biasing the strut and piston toward an extended position, telescopic contraction of the strut into the cylinder resisted by said biasing means;
    a stem having first and second ends, said first stem end fixed to the cylinder and passing through the piston bore having at said second end a head located within the strut, said head having first and second flanges defining therebetween a body; and
    a valve member movably disposed and freely movable on the body between said flanges, said valve member slidably sealing the head within the strut and defining with the piston an air filled volume, telescopic contraction of the strut into the cylinder increasing the volume and telescopic extension decreasing the volume, telescopic motion of the strut into the cylinder frictionally urging the valve member to abut the first flange and telescopic extension of the strut relative to the chamber frictionally urging the valve member to abut the second flange;
    the valve member and at least the first flange cooperating to define a restriction during telescopic extension of the strut to restrict the flow of air from the volume to dampen the same.

2. The improved suspension member of claim 1 further including a venting means comprising a port at the head communicating at one end with the volume and at the other end proximate the first flange, telescopic extension of the strut urging the member to, in cooperation with the first flange, define a restriction to restrict the exhaust of air from the chamber.

3. The improved suspension member of claim 2 wherein the port includes a groove fashioned along the head.

4. The improved suspension member of claim 2 wherein the venting means includes at least one orifice defined in said valve member.

5. The improved suspension member of claim 1 wherein the valve member approximates a truncated sphere defining at its periphery a slidable seal for the head, the valve member having a throughbore to closely pass the body and the restriction is defined by a groove fashioned along the body, and a recess in the body proximate the first flange and the valve member in the position where at it abuts the first flange.

6. The improved suspension member of claim 5 wherein the member is resilient.

7. The improved suspension member of claim 1 wherein the valve member has a bore to closely pass the body and includes a groove along the wall of the bore communicating between first and second cavities, said cavities cooperating with the first and second flanges to define said restriction to the exhaust and drawing of air from and into the volume when the member abuts each of said first and second flanges.

8. An improved suspension member comprising:
    a cylinder;
    a tubular strut having a portion received into the cylinder for telescopic motion, said strut portion received into the cylinder including a piston having a bore, said cylinder and strut coupled between the frame and axle, relative motion between the frame and axle accommodated by telescopic motion between the strut and the cylinder;
    means for biasing the strut and piston toward an extended position, telescopic contraction of the strut into the cylinder resisted by said biasing means;
    a stem having first and second ends, said first end fixed to the cylinder and passing through the piston bore having at said second end a head located within the strut, said head having first and second flanges defining therebetween a body; and
    a valve member movably disposed on the body between said flanges, said valve member defining at its periphery a freely slidable seal within the strut and, between the seal and piston a volume, telescopic contraction of the strut into the cylinder drawing air into the volume and telescopic extension exhausting air from the volume, telescopic motion of the strut into the cylinder causing valve member to move to a position to abut the second flange and telescopic extension of the strut causing the valve member to abut the first flange, said valve member, body and at least the first flange cooperating to define a restriction to the exhaust of air from the volume to dampen extension of the strut from the chamber.

9. The improved suppression member of claim 8 wherein the member includes at least one groove and at least one cavity, said member, first flange, groove and cavity cooperating to define said restriction to at least the exhaust of air from the volume.

10. An improved suspension member coupled between a frame and an axle comprising:
    a cylinder;
    a tubular strut having an end portion extending into the cylinder for telescopic motion, said end portion defining a piston having a bore, said cylinder and strut coupled between the frame and axle, relative motion between the frame and axle accommodated by telescopic motion between the strut and the cylinder, said strut having a removable closure at one end thereof;
    means for biasing the strut and piston toward an extended position, telescopic contraction of the strut into the cylinder resisted by said biasing means;

a stem having first and second ends, said first stem end fixed to the cylinder and passing through the piston bore and having at said second stem end a head located within the strut, said head having first and second flanges defining therebetween a body; and said biasing means including a plurality of cylindrical, elastomeric pads disposed in the strut to act against said stem to urge said cylinder and strut toward an extended position, each pad having proximate each end a circumferential notch; and a coupler disposed between each pad, each coupler including a finger adapted to releasably engage the pad notch to interconnect adjoining pads so that said pads can collectively be pulled from said second strut end.

11. The improved suspension member of claim 10 wherein the coupler is cylindrical having a circumferential finger to engage the pad notch.

12. The improved suspension of claim 10 wherein the coupler includes a finger at each end, each adapted to engage the circumferential notches of abutting said pads to interconnect adjoining pads.

13. An improved suspension member coupled between a frame and an axle comprising:

a cylinder;

a tubular strut having a portion received into the cylinder for telescopic motion, said portion defining at an end received into the cylinder a piston having a bore, said cylinder and strut coupled between the frame and axle, relative motion between the frame and axle accommodated by telescopic motion between the strut and the cylinder;

means for biasing the strut and piston toward an extended position, telescopic contraction of the strut into the cylinder resisted by said biasing means;

a stem having first and second ends, said first stem end fixed to the cylinder and passing through the piston bore having at said second end a head located within the strut, said head having first and second flanges defining therebetween a body; and a valve member movably disposed and freely movable on the body between said flanges, said valve member slidably sealing the head within the strut and defining with the piston an air filled volume, telescopic contraction of the strut into the cylinder increasing the volume and telescopic extension decreasing the volume, telescopic motion of the strut into the cylinder frictionally urging the valve member to abut the first flange and telescopic extension of the strut relative to the chamber frictionally urging the valve member to abut the second flange;

the valve member and at least the first flange cooperating to define a restriction during telescopic extension of the strut to restrict the flow of air from the volume to dampen the same;

said member valve configured to approximate a truncated sphere defining at its periphery a slidable seal for said head, said valve member having a throughbore to closely pass along said body, said restriction being defined by a groove fashioned along said body and a cooperating recess in said body abutting said first flange.

14. The improved suspension member of claim 13 wherein said valve member is resilient.

* * * * *